US008237716B2

(12) United States Patent
Kolipaka et al.

(10) Patent No.: US 8,237,716 B2
(45) Date of Patent: Aug. 7, 2012

(54) ALGORITHM FOR DRAWING DIRECTED ACYCLIC GRAPHS

(75) Inventors: Kashyap Babu Rao Kolipaka, Bangalore (IN); Navin Doshi, Bangalore (IN); Gaurav Chhaparwal, Rajasthan (IN)

(73) Assignee: Fair Isaac Corporation, Minneapolis, MN (US)

( * ) Notice: Subject to any disclaimer, the term of this patent is extended or adjusted under 35 U.S.C. 154(b) by 975 days.

(21) Appl. No.: 12/206,691

(22) Filed: Sep. 8, 2008

(65) Prior Publication Data

US 2010/0060643 A1 Mar. 11, 2010

(51) Int. Cl.
G06T 11/20 (2006.01)
G06T 15/00 (2006.01)
(52) U.S. Cl. ........................................ 345/440; 345/419
(58) Field of Classification Search .................. 345/440, 345/419; 715/243, 853
See application file for complete search history.

(56) References Cited

U.S. PATENT DOCUMENTS

| 5,528,735 A | 6/1996 | Strasnick et al. |
| 5,537,630 A | 7/1996 | Berry et al. |
| 5,546,529 A | 8/1996 | Bowers et al. |
| 5,603,025 A | 2/1997 | Tabb et al. |
| 5,608,898 A | 3/1997 | Turpin et al. |
| 5,623,541 A | 4/1997 | Boyle et al. |
| 5,644,686 A | 7/1997 | Hekmatpour |
| 5,682,487 A | 10/1997 | Thomson |
| 5,692,107 A | 11/1997 | Simoudis et al. |
| 5,696,885 A | 12/1997 | Hekmatpour |
| 5,701,137 A | 12/1997 | Kiernan et al. |
| 5,701,400 A | 12/1997 | Amado |
| 5,710,896 A | 1/1998 | Seidl |
| 5,720,007 A | 2/1998 | Hekmatpour |
| 5,742,836 A | 4/1998 | Turpin et al. |
| 5,745,712 A | 4/1998 | Turpin et al. |
| 5,787,416 A | 7/1998 | Tabb et al. |
| 5,796,932 A | 8/1998 | Fox et al. |
| 5,806,056 A | 9/1998 | Hekmatpour |

(Continued)

FOREIGN PATENT DOCUMENTS

EP 0690367 1/1996

(Continued)

OTHER PUBLICATIONS

Eiglsperger, Markus, et al., "An Efficient Implementation of Sugiyama's Algorithm for Layered Graph Drawing", Journal of Graph Algorithms and Applications, vol. 9, No. 3, pp. 305-325, 2005.*

(Continued)

*Primary Examiner* — Chante Harrison
(74) *Attorney, Agent, or Firm* — James P. Clearly; Mintz, Levin, Cohn, Ferris, Glovsky and Popeo, P.C.

(57) ABSTRACT

A system and method for drawing directed acyclic graphs is disclosed. In particular, an algorithm, as implemented in a method and system, to aesthetically layout directed acyclic graphs is presented. The algorithm includes methods to reduce the number of edge crossings and increase the number of straight edges in such drawings. The algorithm keeps short and straight edges wherever possible and gives preference to vertical edges. It also provides an edge-crossing reduction heuristic to refine the layout obtained after standard median heuristic layout, and further provides a method to focus on important paths in the graph through layout.

18 Claims, 10 Drawing Sheets

U.S. PATENT DOCUMENTS

| | | | |
|---|---|---|---|
| 5,806,256 | A | 9/1998 | Byrne |
| 5,815,415 | A | 9/1998 | Bentley et al. |
| 5,818,155 | A | 10/1998 | Kawamura et al. |
| 5,822,745 | A | 10/1998 | Hekmatpour |
| 5,870,559 | A | 2/1999 | Leshem et al. |
| 5,870,768 | A | 2/1999 | Hekmatpour |
| 5,875,431 | A | 2/1999 | Heckman et al. |
| 5,890,131 | A | 3/1999 | Ebert et al. |
| 5,917,492 | A | 6/1999 | Bereiter et al. |
| 5,920,873 | A | 7/1999 | Van Huben et al. |
| 5,930,764 | A | 7/1999 | Melchione et al. |
| 5,953,017 | A | 9/1999 | Beach et al. |
| 5,953,707 | A | 9/1999 | Huang et al. |
| 5,958,008 | A | 9/1999 | Pogrebisky et al. |
| 5,966,126 | A | 10/1999 | Szabo |
| 5,966,695 | A | 10/1999 | Melchione et al. |
| 5,974,127 | A | 10/1999 | Wernli et al. |
| 5,982,370 | A | 11/1999 | Kamper |
| 5,987,242 | A | 11/1999 | Bentley et al. |
| 5,999,192 | A | 12/1999 | Selfridge et al. |
| 6,014,138 | A | 1/2000 | Cain et al. |
| 6,073,138 | A | 6/2000 | de l'Etraz et al. |
| 6,078,324 | A | 6/2000 | Phathayakorn et al. |
| 6,088,693 | A | 7/2000 | Van Huben et al. |
| 6,089,453 | A | 7/2000 | Kayser et al. |
| 6,094,654 | A | 7/2000 | Van Huben et al. |
| 6,108,004 | A | 8/2000 | Medl |
| 6,111,578 | A | 8/2000 | Tesler |
| 6,112,202 | A | 8/2000 | Kleinberq |
| 6,134,706 | A | 10/2000 | Carey et al. |
| 6,137,499 | A | 10/2000 | Tesler |
| 6,237,499 | B1 | 5/2001 | McKoy |
| 6,249,768 | B1 | 6/2001 | Tulskie, Jr. et al. |
| 6,285,366 | B1 | 9/2001 | Ng et al. |
| 6,292,830 | B1 | 9/2001 | Taylor et al. |
| 6,327,551 | B1 | 12/2001 | Peterson et al. |
| 6,396,488 | B1 | 5/2002 | Simmons et al. |
| 6,411,936 | B1 | 6/2002 | Sanders |
| 6,646,652 | B2 | 11/2003 | Card et al. |
| 6,738,736 | B1 | 5/2004 | Bond |
| 7,000,199 | B2 | 2/2006 | Steele et al. |
| 7,346,529 | B2 | 3/2008 | Flores |
| 7,932,907 | B2 * | 4/2011 | Nachmanson et al. ....... 345/440 |
| 2002/0147626 | A1 | 10/2002 | Zagotta et al. |
| 2003/0069869 | A1 | 4/2003 | Gronau et al. |
| 2004/0039619 | A1 | 2/2004 | Zarb |
| 2004/0073442 | A1 | 4/2004 | Heyns et al. |
| 2004/0107131 | A1 | 6/2004 | Wilkerson et al. |
| 2008/0291203 | A1* | 11/2008 | Nachmanson et al. ....... 345/440 |
| 2009/0192809 | A1* | 7/2009 | Chakraborty et al. ............ 705/1 |

FOREIGN PATENT DOCUMENTS

| | | |
|---|---|---|
| EP | 0717346 | 6/1996 |
| EP | 0770967 | 5/1997 |
| EP | 0978989 | 2/2000 |
| WO | 93/20510 | 10/1993 |
| WO | 95/12161 | 5/1995 |
| WO | 97/21171 | 6/1997 |

OTHER PUBLICATIONS

U.S. Appl. No. 11/845,291, filed Aug. 27, 2007, Crawford.
U.S. Appl. No. 12/201,400, filed Aug. 29, 2008, Crawford.
Pook, Stuart, et al. "Context and Interaction in Zoomable User Interfaces," (ACM Press) pp. 227-231 & 317, May 2000, Palermo, Italy.
Sarkar et al. "Graphical Fisheye View of Graphs," ACM 1992.
Bederson et al. "Pad++: A Zoomable Graphical Interface for Exploring Alternative Interface Physics," ACM 1994.
Fekete et al. "Excentric Labling: Dynamic Neighborhood Labeling for Data Visualization," ACM 1999.
Hightower et al. "Graphical Multiscale Web Histories: A Study of PadPrint", 1998.
Bederson et al. "A Zooming Web Browser", 1997.
Noik "Layout-Independent Fisheye Views of Nested Graphs", 1993.
Clark, J., "Customizing Common Controls" Sep. 1997: Dr. Dobbs Journal.
Coffee, Peter "SPSS More Than a Pretty Face" Feb. 1996 PC Week.
Furnas, George W., "Generalized Fisheye Views" 1986 Human Factors in Computing Systems CHI '86 Conference Proceedings.
Lamping, et al. "A Focus+Context Technique Based on Hyperbolic Geometry for Visualization Hierarchies" Xerox Palo Alto Research Center, 1995.
Kohavi, "Bottom Up Induction of Oblivious Read-Once Decision Graphs" European Conference on Machine Learning 1994.
Friedman et al. "Finding the Optimal Variable Ordering for Binary Decision Diagrams" ICCC Transactions on Computers, vol. 39, No. 5 May 1990.
Covaliu, Zvi, "Decision Analysis: Concepts, Tools and Promise" Fair Isaac White Paper, 2001.
Efron & Tibshirani, *An Introduction to the Bootstrap* (1993).
Brian R. Gaines, "Transforming Rules and Trees into Comprehensible Knowledge Structures," Knowledge Discovery in Databases II. AAAI/MIT Press 1995.

* cited by examiner

The first step shows the creation of the tree copy of the DAG. The second step shows how a layout of the tree copy is used to layout the DAG.

Compare to Fig 5, this graph has the reduction of 2 edge crossings. In fact, crossing between the edges "a1 = 2, 3 and a2 = 1" and "a1 = 2, 3 and a2 = 2, 3" has been totally removed.

The bold paths are the interesting paths but it is difficult to focus on these paths in the layout.

The bold paths are the interesting paths and are highlighted through the layout.

ALGORITHM FOR DRAWING DIRECTED ACYCLIC GRAPHS

BACKGROUND

This disclosure relates generally to data processing, and more particularly to algorithms and systems for drawing directed acyclic graphs.

Directed Acyclic Graphs (DAG) are used to represent information in many disciplines such as software applications, communication networks and web data analysis. Nicely drawn graphs make it easy to visualize and comprehend the represented information. We will use the term "Aesthetics of Graph" to refer to the how nicely the nodes are laid out and edges are drawn.

There is no objective measure of aesthetics for graph layouts. However based on hand-made drawings, it is observed that avoiding edge crossings and congestion, keeping short and straight edges, and favoring geometry and symmetry are principles or goals that lead to aesthetically better graphs. It is very hard to optimize all of these aesthetics goals simultaneously. In fact, it is computationally intractable (NP-hard) to minimize edge crossings or to maximize graph symmetry. This has led to many heuristic-based algorithms that try to satisfy the above aesthetic principles.

Graph drawing has long been a topic of research, and there have been many papers published on both "graph drawing" and various "aesthetic principles." Most iterative graph drawing algorithms use compaction as one of their steps. Typically Quadratic Programming methods are used to achieve compaction, which can turn out to be very computationally intensive. This is a deterrent in applications where graphs are drawn and re-drawn frequently. Therefore, there is a need for algorithms which are fast and achieve good compaction.

SUMMARY

In general, this document discusses a system and method for drawing DAGs. In particular, the document presents an algorithm to aesthetically layout directed acyclic graphs. The algorithm includes methods to reduce the number of edge crossings and increase the number of straight edges in such drawings. The algorithm keeps short and straight edges wherever possible and gives preference to vertical edges. It also provides an edge-crossing reduction heuristic to refine the layout obtained after standard median heuristic layout. The document also presents an algorithm to focus on interesting paths in the directed acyclic graph through layout.

In accordance with one implementation a computer-implemented method for drawing directed acyclic graphs includes the step of receiving, in a computing system, information representing a directed acyclic graph. A computer processor of the computing system is configured for generating a layout of the directed acyclic graph. The layout includes one or more subgraphs. Each subgraph includes two or more nodes and edges that connect pairs of nodes, the nodes and edges being defined in x- and y-coordinates. The computer processor is further configured for reducing the number of edge crossings in the layout of the directed acyclic graph, straightening the edges of the layout of the directed acyclic graph, compacting one or more subgraphs along x-coordinate axis to generate a compacted DAG layout, and assigning new y-coordinates to the nodes of the one or more subgraphs such that the nodes do not overlap in the y-coordinate to generate a new layout of directed acyclic graph.

In another implementation, a method, executable by a computer processor, for drawing directed acyclic graphs, includes the step of generating a layout of the directed acyclic graph. The layout includes one or more subgraphs, and each subgraph comprising two or more nodes and edges that connect pairs of nodes, the nodes and edges being defined in x- and y-coordinates. The method further includes the steps of reducing the number of edge crossings in the layout of the directed acyclic graph, straightening the edges of the layout of the directed acyclic graph, compacting one or more subgraphs along x-coordinate axis to generate a compacted DAG layout, and assigning new y-coordinates to the nodes of the one or more subgraphs such that the nodes do not overlap in the y-coordinate to generate a new layout for directed acyclic graph.

In yet another implementation, a method, executable by a computer processor, for drawing interesting and non-interesting paths in the directed acyclic graphs such that it is easy to focus on interesting paths. The layout includes one or more subgraphs, and each subgraph comprising two or more nodes and edges that connect pairs of nodes, the nodes and edges being defined in x- and y-coordinates. The method further includes dividing interesting path nodes into clusters, finding an order of interesting node clusters and assigning slot (vertical spans) to these clusters, dividing non-interesting path nodes in the vertical spans available between the vertical spans of interesting node clusters. The method farther includes the step of laying out nodes and edges in each vertical span using the method to layout of the directed acyclic graph as substantially described above.

The details of one or more implementations are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a system and method for improved drawing of directed acyclic graphs (DAGs). The following assumptions are made about the graphs:

First, the input DAG is "leveled," meaning that each node is assigned a number, called its "level," such that all the nodes with the same level are drawn on the same horizontal line and every edge is directed from a node with a higher level towards a node with a lower level. Any unleveled DAG can be converted to a leveled DAG with a maximum number of short edges in polynomial time using "Coffman-Graham method" or integer and linear programming methods. Accordingly, the techniques employed by the algorithm are applicable to any DAG.

Second, it is assumed that the DAG has only one root node. In case the graph has more than one root, this algorithm can be used by adding a "virtual root" which has edges to each of the existing roots of the graphs. In addition, if there are several disconnected components in the graph, the algorithm can be run on each component independently and then these components can be placed in disjoint spans along x direction.

Third, the algorithm is described for a vertical (top-down) layout. This top-down orientation can be easily modified to obtain a horizontal (left-right) orientation by simply interchanging the uses of x- and y-coordinates and width and height of the nodes.

The following definitions are used in the document:
Span: A Span is the space between two vertical lines, which are called its boundaries. The width of a span is the distance between its boundaries. A span can be represented by a pair of numbers, (a, b), where a, b are the x-coordinates of the left boundary and right boundary respectively.

Immediate sub-trees: The immediate sub-trees of a tree T, rooted at r, are the sub-trees formed by the children of r.

Leaf node: In a DAG, a node without any outgoing edges is called the leaf node.

Root node: In a DAG, a node without any incoming edges is called a root node. The DAGs and Trees are assumed to have exactly one root node.

Node Width: Each node has a finite width. We will denote width of a node n by NodeWidth(n).

Vertical Edge: In a graph layout, an edge is called a Vertical Edge if both its end points lie on the same vertical straight line.

Median Edge: In a graph layout, an edge is called a Median Edge if either the source is at the median x-coordinate of all the target's parents or the target is at the median x-coordinate of the source's children.

Vertical Median Edge: In a graph layout, an edge is called a Vertical Median Edge if it is both a vertical edge and a median edge.

Vertical Chain: A Vertical Chain is a list of nodes such that every node in the list has a vertical edge to the next node and all the edges lie on the same vertical straight line.

Figure 1:
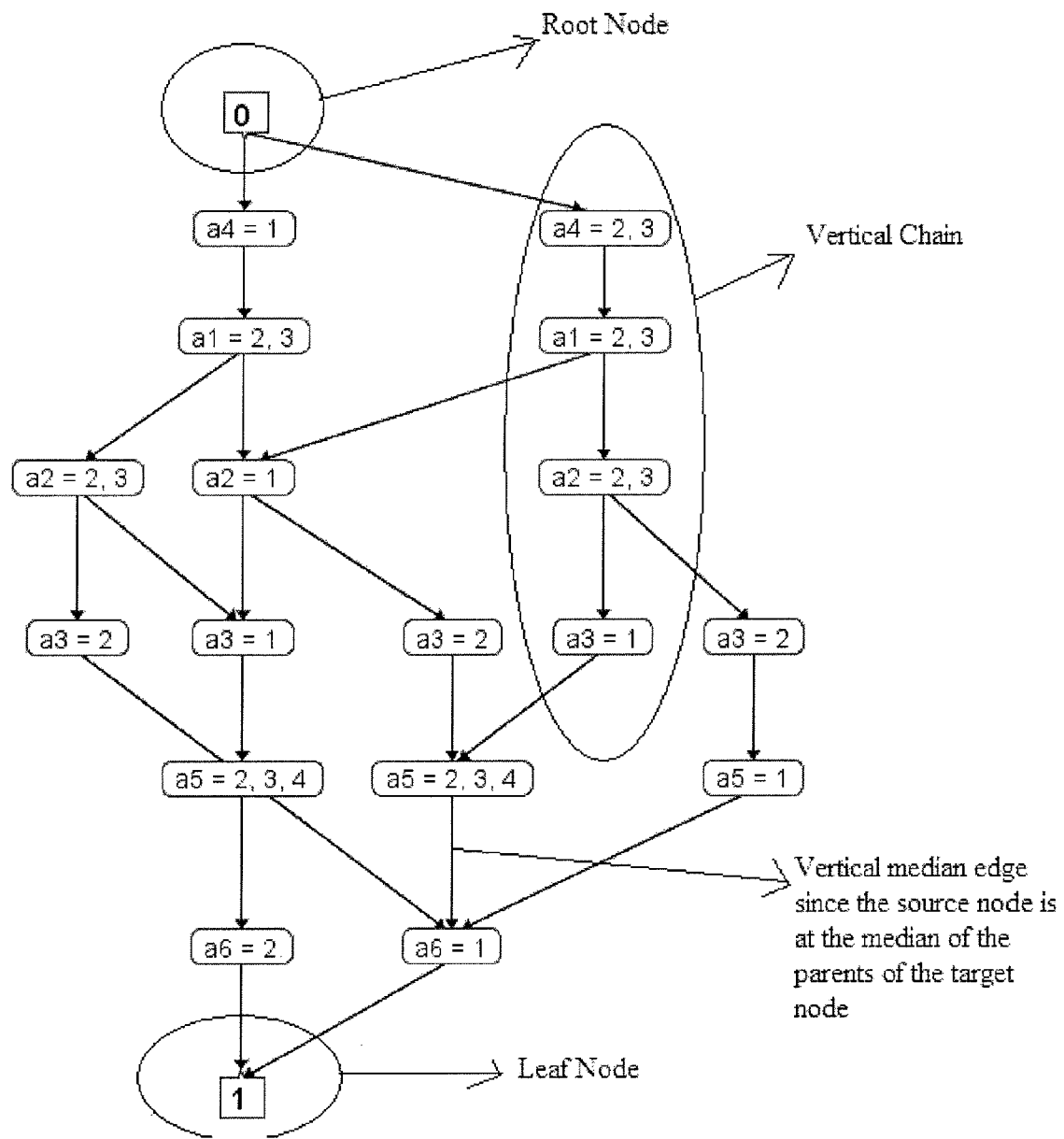
FIG. 1 illustrates a root node, leaf nodes, median, vertical median edges, and vertical chain in an exemplary graph.

For ease of description, the Y-axis is referred to as "vertical" and the X-axis is referred to as "horizontal." Lesser x-coordinates are referred as being to the "left" and lesser y-coordinates are referred as being "higher." FIG. 1 contains examples for root node, leaf nodes, median, vertical median edges and vertical chain.

Figure 10:
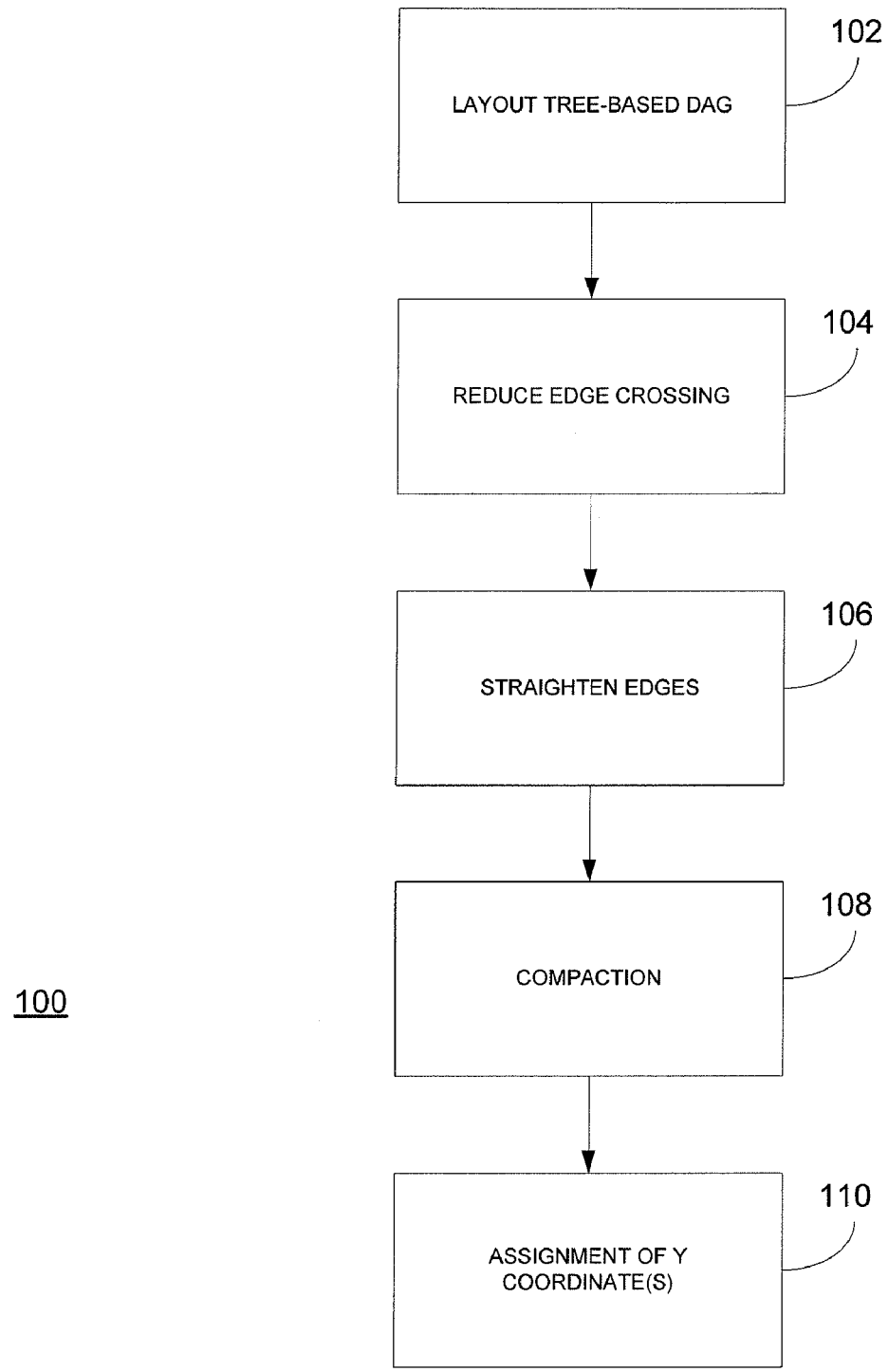
FIG. 10 is a flowchart of a method for drawing a DAG.

The Input to the algorithm is any rooted, leveled DAG and the output is an assignment of x and y coordinates to its nodes. With reference to FIG. 10, a DAG layout method 100 includes tree-based DAG layout (step 102), edge-crossing reduction (step 104), edge straightening (step 106), compaction (step 108), and assignment of y coordinates (step 110).

These steps are run sequentially, one after the other. Each step (except step 102) imposes certain constraints that have to be obeyed by the succeeding steps. Each constraint maintains some aesthetic property of the drawing. It is noted that any individual step in itself can be also reused along with other algorithms. The first four steps of the algorithm assign only x-coordinate to the nodes and the last step assigns the y-coordinates. Following are the details of the various steps in DAG Layout Algorithm.

Tree-Based DAG Layout 102

The purpose of this step is to obtain an initial drawing of the DAG "as a tree," which means that if the sub-graphs formed by any two children of a node are disjoint, they will be drawn in disjoint vertical spans. This drawing is further improved by reducing edge crossings, 'straightening" edges and compaction. Following are the steps in the Tree-based DAG layout:

First, a "tree copy" of the DAG is constructed using the following algorithm:
  Create one copy of every leaf node for each of its parents and make each parent point to a different copy rather than the original leaf node.
  Let N be a node that has not been copied yet, has more than one parent and all of its children have been copied.
  While N exists, repeat the following step,
    Construct a copy of the sub-tree rooted at N for each of its parents and make each of its parents point to a different copy.

Figure 2:
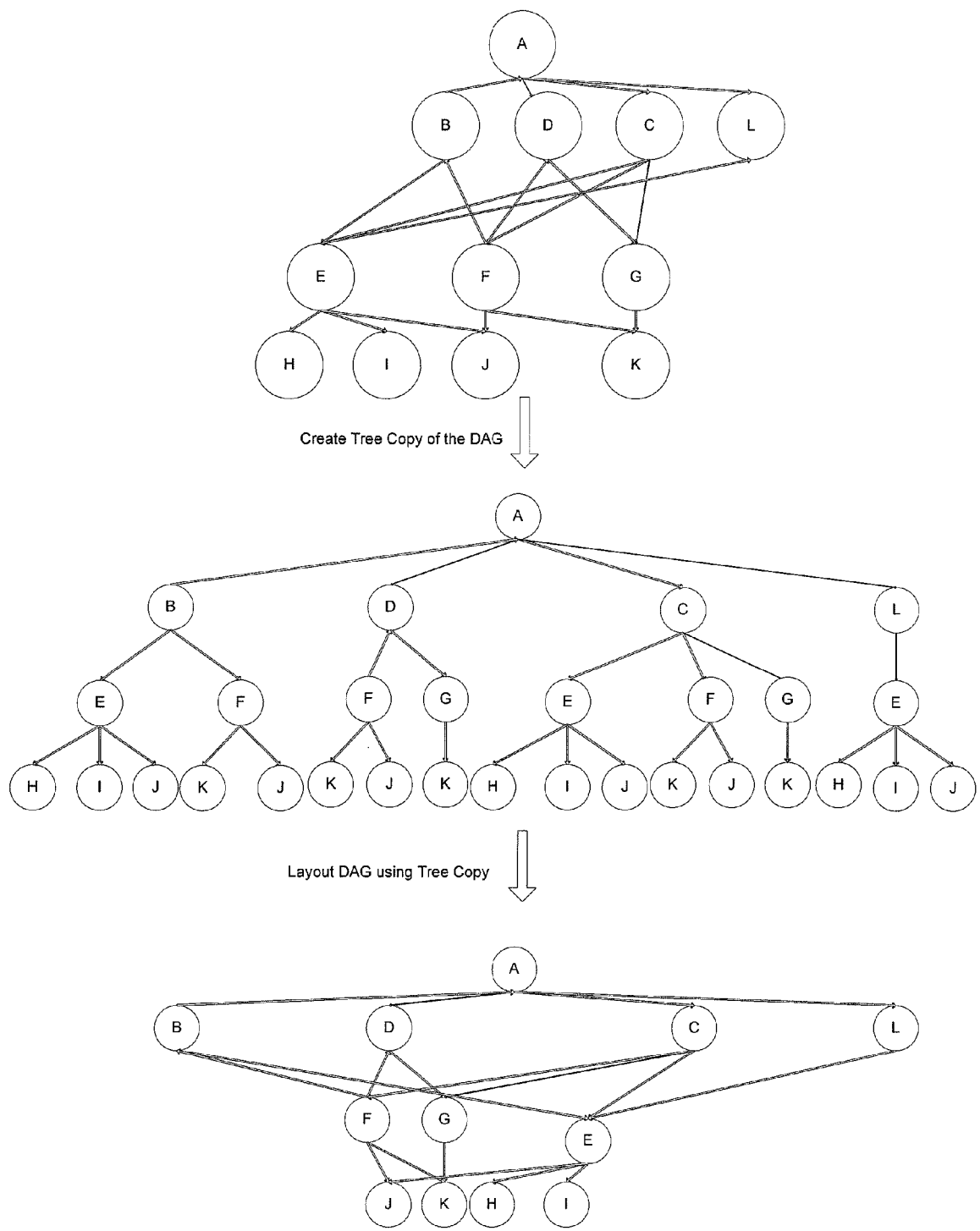
FIG. 2 illustrates creation of a tree copy of a DAG, and a layout of the tree copy being used to lay out the DAG.
Figure 3:
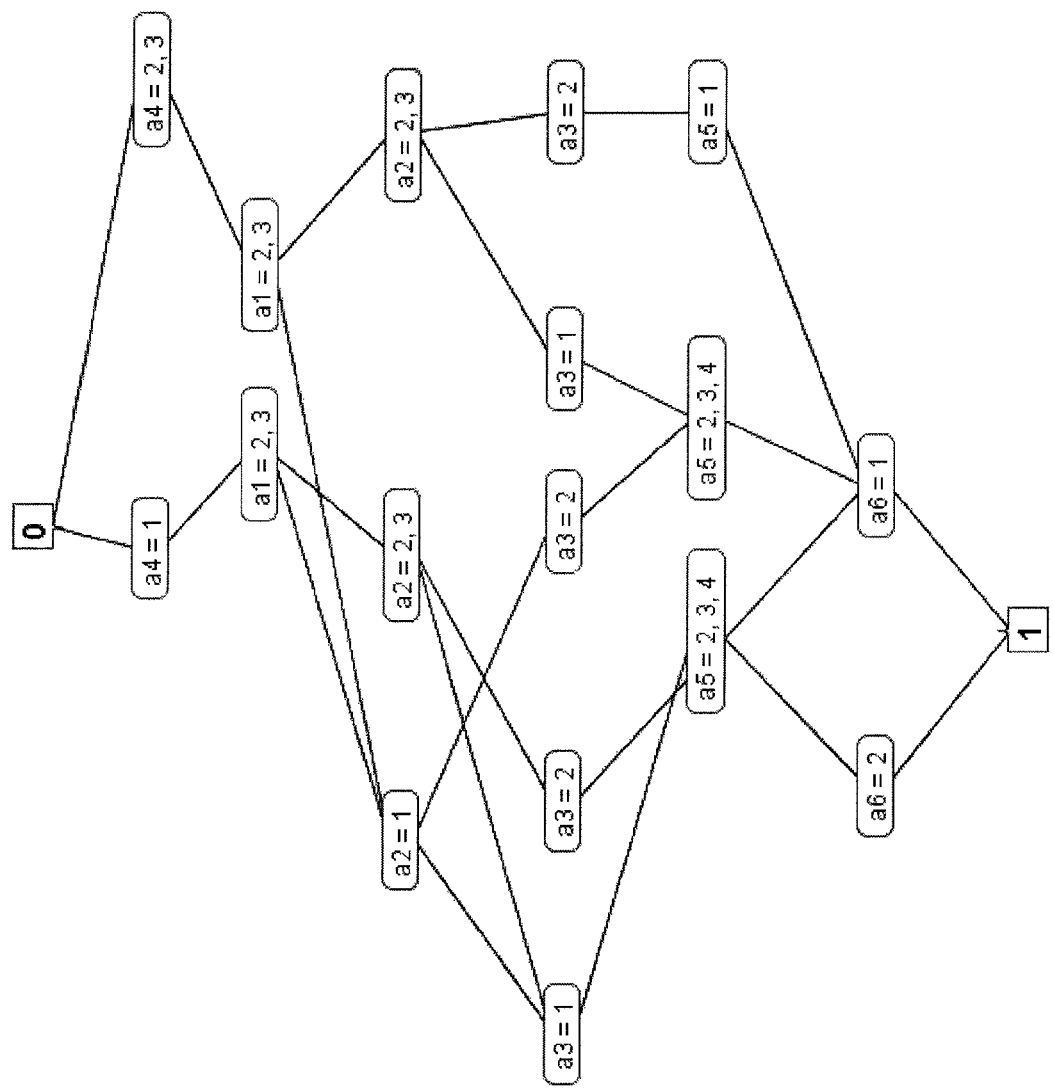
FIG. 3 shows an input DAG before it is laid out.

Example: The first conversion of step in FIG. 2 shows the conversion of a DAG to its tree copy. Note that the root need not be copied because it does not have any parents. Also observe that this "copy" of the DAG is in fact a tree.

Next, the width of all sub-trees in the "tree copy" is found. The width of a sub-tree is the maximum width required for its layout without node overlapping. It is the greater value out of the sum of the width of the root's immediate sub-trees and the width of the root itself. In a special case when the sub-tree is only the leaf node, the width is taken as the node's width. Formally, width for a sub-tree T can be defined as follows:
  Let r be the root of T, k be number of children of r, and let $T_1, T_2, \ldots, T_k$ be its immediate sub-trees.
  If k=0, that is r is a leaf node,
  TreeWidth m=NodeWidth(r)
  Otherwise,
  TreeWidth (T)=Maximum{NodeWidth(r), (TreeWidth $(T_1)$+TreeWidth$(T_2)$+ . . . +TreeWidth$(T_k)$)}

The width of all the sub-trees can be computed in a bottom-up fashion by starting at the leaves and computing the width of a sub-tree after having computed the widths of all its immediate sub-trees. For instance, the nodes could be visited in Depth First order and their corresponding sub-tree widths; can be computed in that order.

Figure 4:
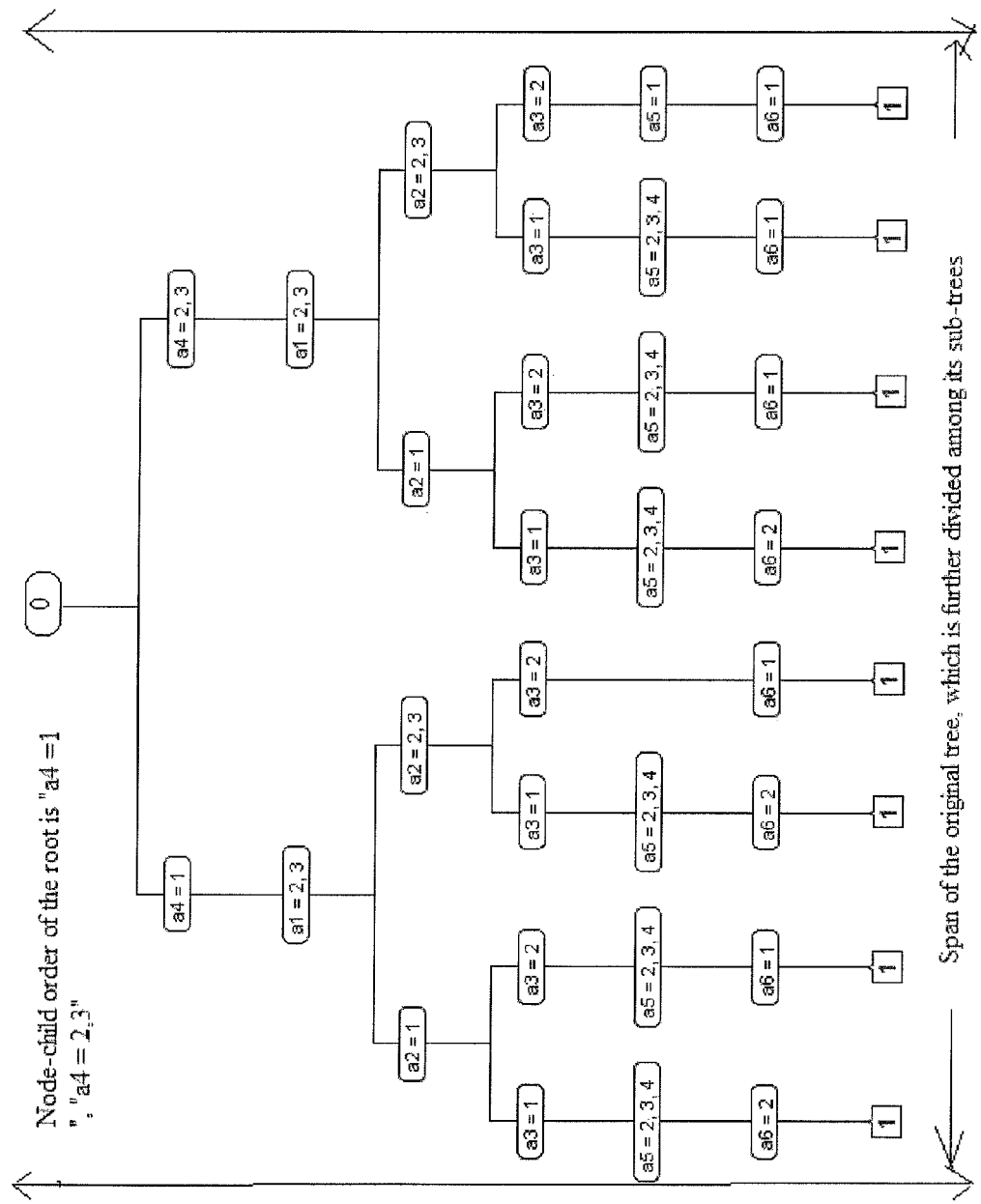
FIG. 4 shows a layout of a tree copy of the DAG shown in FIG. 3.

Next, the DAG is laid out using the "tree copy" of the DAG. To ensure that no overlaps occur in the tree layout along the x direction, the immediate sub-trees of a node are drawn in disjoint spans. Below are the steps:

1. Assign a span to the entire "tree copy." The width of this span is equal to the width of the tree which was computed above. The tree is trivially a sub-tree of itself, so all the steps below executed on a sub-tree will also be valid for the original tree.
2. The root of the sub-tree is drawn at the center of the assigned span, i.e., the x-coordinate of the root is set to be the mean of the x-coordinates of the corresponding bounding vertical lines.
3. The assigned span of a sub-tree is divided among the "immediate sub-trees" in the ratio of their widths. Example: FIG. 4 depicts the division of the span of the entire tree among its immediate sub-trees, in ratio of their widths. The two-headed vertical lines denote the spans of each of the sub-trees.
4. Each of the immediate sub-trees is laid out recursively in their assigned spans by following the previous two steps 2 and 3. The recursion terminates when leaf nodes are reached.
5. Once the entire "tree copy" is laid out, for each node in the DAG, its x-coordinate is set to be the median of the x-coordinate of its copies. Example: The second step in FIG. 2 shows how a layout of the tree copy of a DAG is used to layout the DAG by assigning the node, the median value of the x-coordinates of its copies.

For a given node r, the order of children, $c_1, c_2, \ldots, c_k$, used above in the layout algorithm is called the "child-order of the node r" in the layout, and the set of child-orders for all the nodes in the tree copy is called the "child-order of the DAG" in the layout. This definition is used in describing a heuristic that reduces edge-crossings in a DAG layout. Example: FIG. 4, shows the node child-order for the root of the tree which is "a4=1", "a4=2,3."

Reduce Edge-Crossing 104

The number of edge-crossings in the DAG layout (described in step 102) depends on the child-order of its tree copy. We will describe a heuristic algorithm that changes child-order of the DAG to reduce the number of edge-crossings. This heuristic is run first time after a preliminary execution of the DAG layout, where the child-order is arbitrary. Hence there is a need to run the heuristic second time to account for the changes in x positions of nodes.

Heuristic steps:
1. For each node N, identify the nodes which are at a higher level than N and have an edge to some descendant of N. The higher level nodes can be either in an ancestor chain or any other node above the current node's level. Compute the median of x-coordinates of these identified nodes and refer this median value as the "order weight of N." The idea is that, to reduce edge crossings, a node should be laid out closer to the nodes with which it shares descendants.
2. Run the Tree-based DAG layout described above by changing the child-order of the nodes in the "tree copy." The child-order of any node N is obtained by sorting children of N in increasing order of order weights computed in the first step. Since the Order Weight of all the copies of a particular node is same, the order of the immediate children of any node is the same in all its copies.
3. Repeat the steps 1 and 2 above at least one more time to ensure that any changes to node position as a result of edge-crossing heuristic are accounted in determining the x coordinate of the node.

Figure 5:
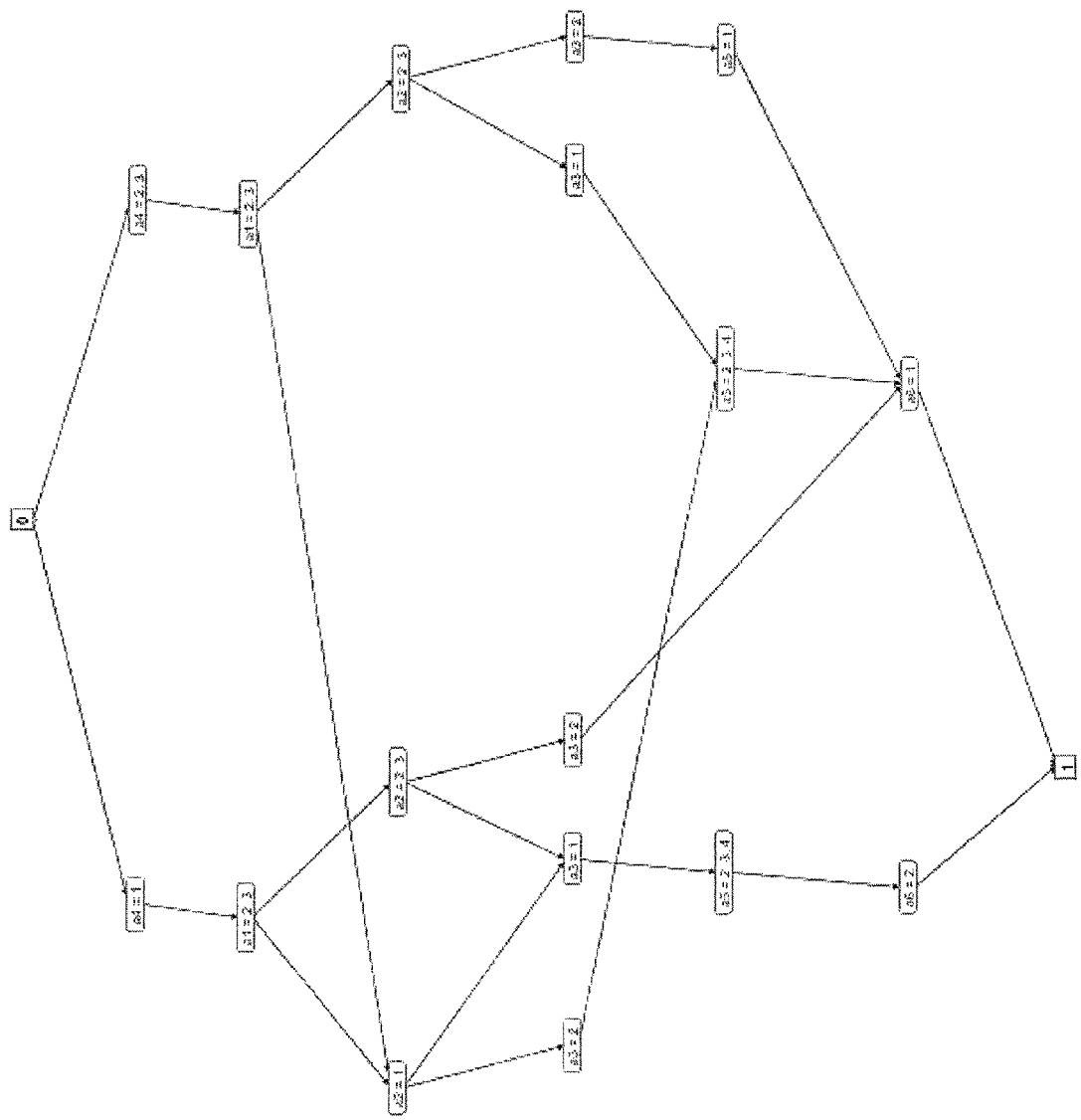
FIG. 5 shows a layout of the DAG before an edge crossing heuristic is applied.
Figure 6:
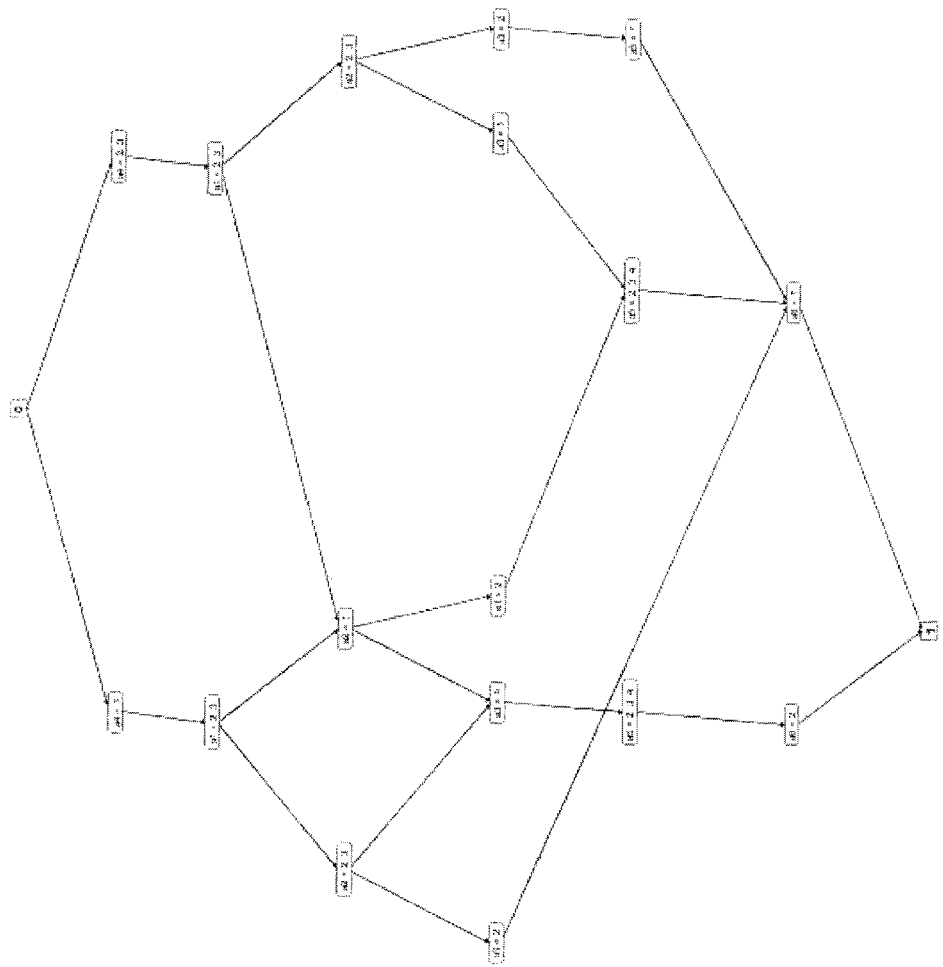
FIG. 6 shows a layout of the DAG after the edge crossing heuristic is applied.

FIG. 5 shows an example of a layout before edge crossing heuristic is applied and FIG. 6 shows an example of a layout after applying the edge heuristic algorithm. There is a reduction of two edge crossings in the graph in FIG. 6 compare to the graph in FIG. 5. In fact, crossing between the edges "a1=2, 3 and a2=1" and "a1=2, 3 and a2=2, 3" has been totally removed.

Edge-Straightening 106

It has been observed that decision graphs with straight vertical edges are aesthetically superior and easier to visualize. "Edge Straightening" maximizes the number of vertical median edges under the constraint that the order of nodes at a level is not changed. This constraint ensures that there is no increase in the number of edge crossings during this step. Finding an optimal edge-straightening under this constraint is intractable and hence a heuristic is proposed to achieve this task. The heuristic employs a greedy approach by iteratively optimizing the number of vertical median edges that start or end at nodes at each level. This iterative step is called a "Level-Straightening step" which is applied to every level in top-down order. Below are the details of the "Level Straightening Step:"

The input to the Level-Straightening algorithm is a DAG layout and a level. In this step nodes are repositioned such that:
  Only nodes present at the level are moved.
  The order of nodes at the level is unchanged.
  None of the nodes at the level overlap.
  Each node at the level is either placed at the median x-coordinate of its parents or children, or its x-coordinate is unchanged. For a node N, these three possible slots are labeled as $N_1$, $N_2$, $N_3$ respectively.
  The number of vertical median edges is a maximum, given the above constraints.

The assignment of nodes to one of the three possible slots that satisfies all the above is called an "Optimal Slot Assignment" for that level.

Before the details of "Optimal Slot Assignment" computation are described, some notations are defined and the basis of the algorithm is discussed. Assume that there are M nodes at the level and they are labeled with integers from 1 to M, from left to right; let OPT(N, i) denote a slot assignment of nodes to the right of N (nodes N+1 to M) that has maximum number of vertical median edges when N is placed in slot $N_i$. Let OPTValue(N, i) denote the number of vertical median edges in OPT(N, i). Note that if $N_i$ is a median slot, it is already accounted in OPTValue(N, i).

To compute OPT(N, i), the following observations are made:

An assignment of type OPT(N, i) contains an assignment of the node (N+1) to a slot that gives most number of vertical median edges. This slot is called $(N+1)_{best}$. $(N+1)_{best}$ is calculated by computing the OPTValue (N+1, j) for j=1 to 3 such that $N+1_j$ is strictly to the right of $N_i$ and then taking the one with the maximum value. The assignment OPT((N+1), best) is the desired assignment for N+1 for a given OPT(N,i). Note that computing OPT(N+1, best) in turn contains the best assignment for (N+2) and so on. This continues recursively until the right most node M is reached. Further note that the assignment OPT(1, best) gives the desired "Optimal Slot Assignment" for a level where $1_{best}$ is the best slot value that gives the maximum value out of OPTValue (1, s) for s=1, 2, 3.

The "Level-Straightening" algorithm inputs a level and the DAG, and outputs an Optimal Assignment of nodes to slots. This algorithm has two main steps:

First, OPTValue(N,s) is computed: For every node and slot pair, (N,s) compute OPTValue(N,s) which is the maximum number of vertical median edges to the right of N when it is placed in Ns. The OPTValues for nodes are stored in cache so that these can be reused in calculations of OPTValues for nodes to their left. This is done as follows:

a) For node M, which is the right-most node at the level, compute OPTValue(M,s) for s=1, 2, 3 as follows:
  Store OPTValue(M, s)=1 if s=1 or 2 or the original position of N is at the median of its parents or children,
  Else, store OPTValue(M, s)=0
b) Starting from the second rightmost node (M−1) to the leftmost node 1 in that order, repeat the step c) and d) for every Node N.
c) Repeat step d) for s=1, 2, 3
d) Over all slots, $N+1_i$ (1<=i<=3) that are strictly to the right of slot $N_s$, find the slot of N+1 for which OPTValue(N+1, i) is maximum. Let $(N+1)_{best}$ denote this slot. Then,
  Store OPTValue(N, s)=OPTValue(N+1, best)+1 if s=1 or 2 or the original position of N is at the median of its parents or children.
  Otherwise store OPTValue(N, s)=OPTValue(N+1, best).

Second, nodes are repositioned using the values of maximum vertical median edges computed and stored in the last step.

Sub-step 1: First, find out the best slot value $1_{best}$ for the first node by finding the maximum value out of OPTValue (1, i) for i=1, 2, 3. Then using $1_{best}$ invoke recursive method FindOPT(1, best) mentioned in sub-step 2 to reposition nodes optimally:

Sub-step 2: FindOPT(N, s), using input: Node N and slot s
Assign N to slot $N_s$.
If N is the right-most node at this level, return. This is the termination step for recursion.
Over all slots of N+1 that are strictly to the right of $N_s$, find the slot for which OPTValue (N+1, i) is maximum. If $(N+1)_{best}$ is this slot, call recursively FindOPT (N+1, best)

Layout Compaction 108

Figure 7:
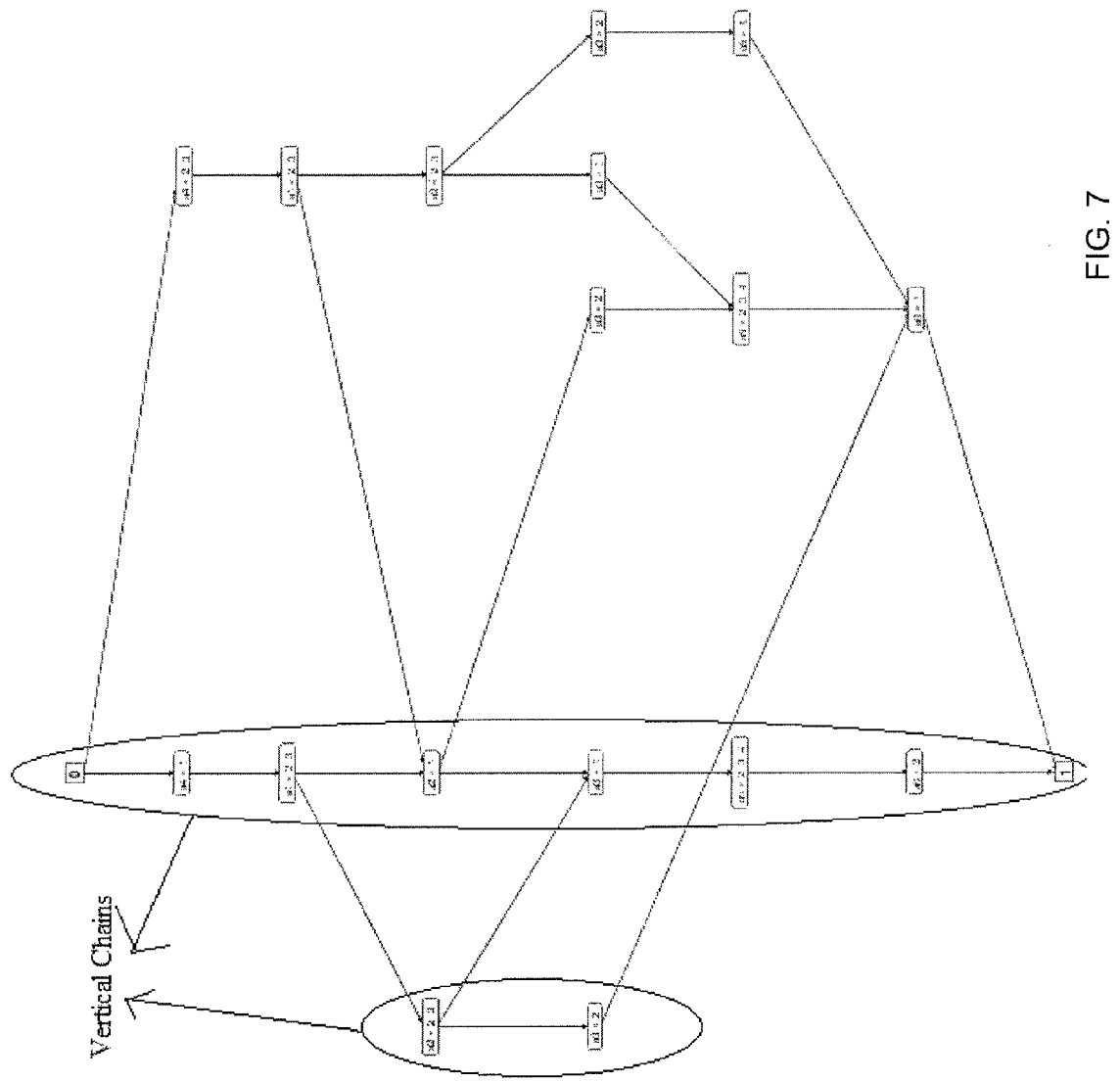
FIG. 7 shows the DAG after edge-straightening is performed.

Initially the DAG was laid out as a tree and as a result more width is assigned to subgraphs and there is opportunity to make the graph compact by bringing the nodes and edges closer. This width reduction step is run after the Edge-Straightening step. The order of nodes at the level is unchanged, and the vertical and median properties of an edge are unchanged in compaction, to ensure there in no change in the edge crossings and number of vertical median edges:

For compaction, the graph is first partitioned into "vertical chains" and then these chains are brought closer without causing any node overlaps with other chains. FIG. 7 shows two examples of vertical chains in a graph. Following are the steps of compaction:

1. Divide the graph in two sets of nodes: "compacted graph nodes" and "remaining graph nodes." Initially "compacted graph nodes" is empty and "remaining graph nodes" has all the nodes.
2. If "remaining graph nodes" is empty, no need to proceed. Skip step 3 to 5.
3. Identify leftmost Vertical Chain in "remaining graph":
   a) Find the node with the left-most position in the "remaining graph nodes" and if there are multiple such nodes, consider the one which is topmost. Let this node be N.
   b) Next find the vertical edge chain starting at N. Initialize the vertical chain containing N to contain only the node N. Note that every node itself is also a vertical chain with one node.
   c) Now find a child C of N that has a vertically straight edge connecting to N. If no such child exists then vertical chain is complete. So go to step 4.
   d) If a vertical straight edge from N to child C exists, then add this edge to the vertical chain.
   e) Now repeat steps b) to d) for the children of C by assigning N=C until we keep finding a vertical edge in the descendants.
4. Move the vertical chain thus formed towards the left as far as possible such that the edges in the chain are maintained vertical and the nodes in the chain do not overlap any of the "compacted graph nodes" and the level order is maintained. If this is the first vertical chain (left most chain in graph) then there is no need to move the vertical chain.
5. Remove the nodes of the vertical chain from "remaining graph nodes" and add to "compacted graph nodes." Go to step 2.

Example: FIG. 1 shows the compacted layout of the graph in FIG. 7.

Assignment of y-Coordinates 110

All the levels are assigned the y coordinate in their top to bottom order such that the nodes don't overlap vertically. Nodes are assigned the same y coordinate assigned to their level. For each level, we compute a weight function which is the ratio of square of the number of incoming edges to that level divided by the number of nodes at that level. To increase readability, the vertical separation of a level from the level above it, is kept proportional to the value of the weight function.

Path Highlighting Through Layout:

The above described DAG layout assumes that all the nodes and edges in the graph are of equal importance. In some applications, it is required to focus on certain graph paths and there is a need to layout such paths nicely and as straight as possible. For example, a decision graph may be needed to be laid out such that the most frequently visited paths are highlighted. A similar need can also arise in drawing PERT graphs where certain critical paths are needed to be specially highlighted.

Figure 8:
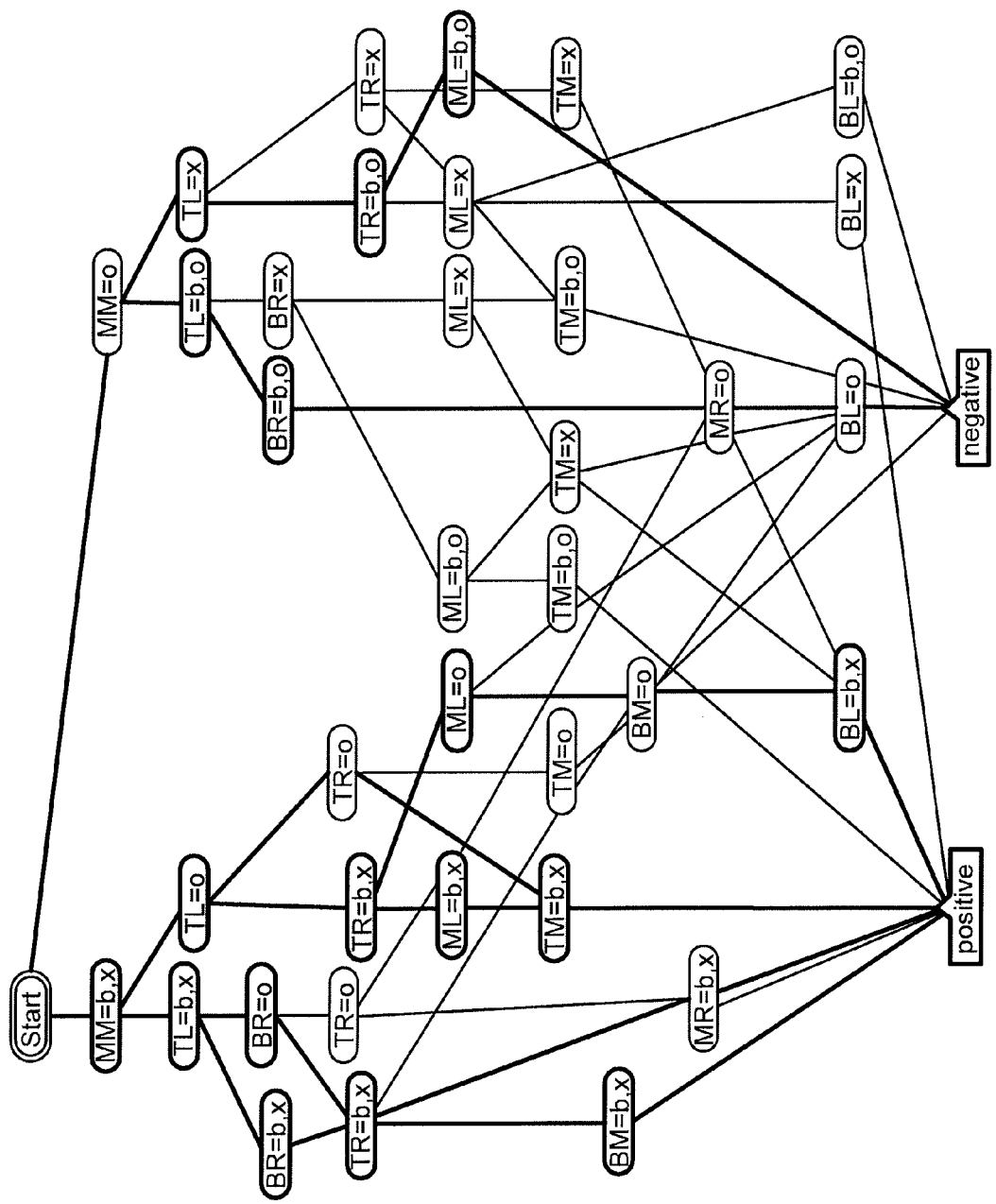
FIG. 8 shows the layout of the DAG before path-based highlighting.

An algorithm that gives importance to aesthetically laying out a given set of interesting paths will now be described. This enables users to focus on those interesting paths easily. Nodes which lie on interesting paths are known as interesting nodes and those that do not lie on any interesting path are known as non-interesting nodes. The algorithm described below uses the DAG layout described earlier in the document. The algorithm draws interesting paths before non-interesting paths which ensures that interesting paths have priority over non-interesting paths in straightening. In addition, the edge crossing between interesting paths and with non-interesting paths is also reduced. Below are steps of the algorithm:

1) Divide the Paths Into Clusters:

The above described DAG layout does not give importance to any paths during straightening. For example, FIG. 8 shows a DAG laid out using the above algorithm and the paths in bold represent interesting paths. It can be seen that there is a lot of cluttering, and none of the interesting paths stand out. Therefore, the graph is divided into interesting sub-graphs where each sub-graph is likely to contain a higher percentage of interesting paths than the original graph and hence is likely that more interesting paths are "straightened." To do this, the interesting paths are clustered based on the number of common nodes between two paths. There is a variety of clustering algorithms and similarity measures that can be used.

In preferred implementations, the following approach is used: A similarity score is defined for two interesting paths as the number of common nodes and a "Path Similarity Graph" is constructed. The vertices of this similarity graph are nothing but interesting paths in the original DAG, and two vertices are joined by an edge if the similarity score of their corresponding paths is above a certain predefined threshold. The clusters of paths are then the connected components in the Path Similarity Graph. These connected components can be computed using standard graph traversal algorithms like Depth First Traversal or Breadth First Traversal.

Figure 9:
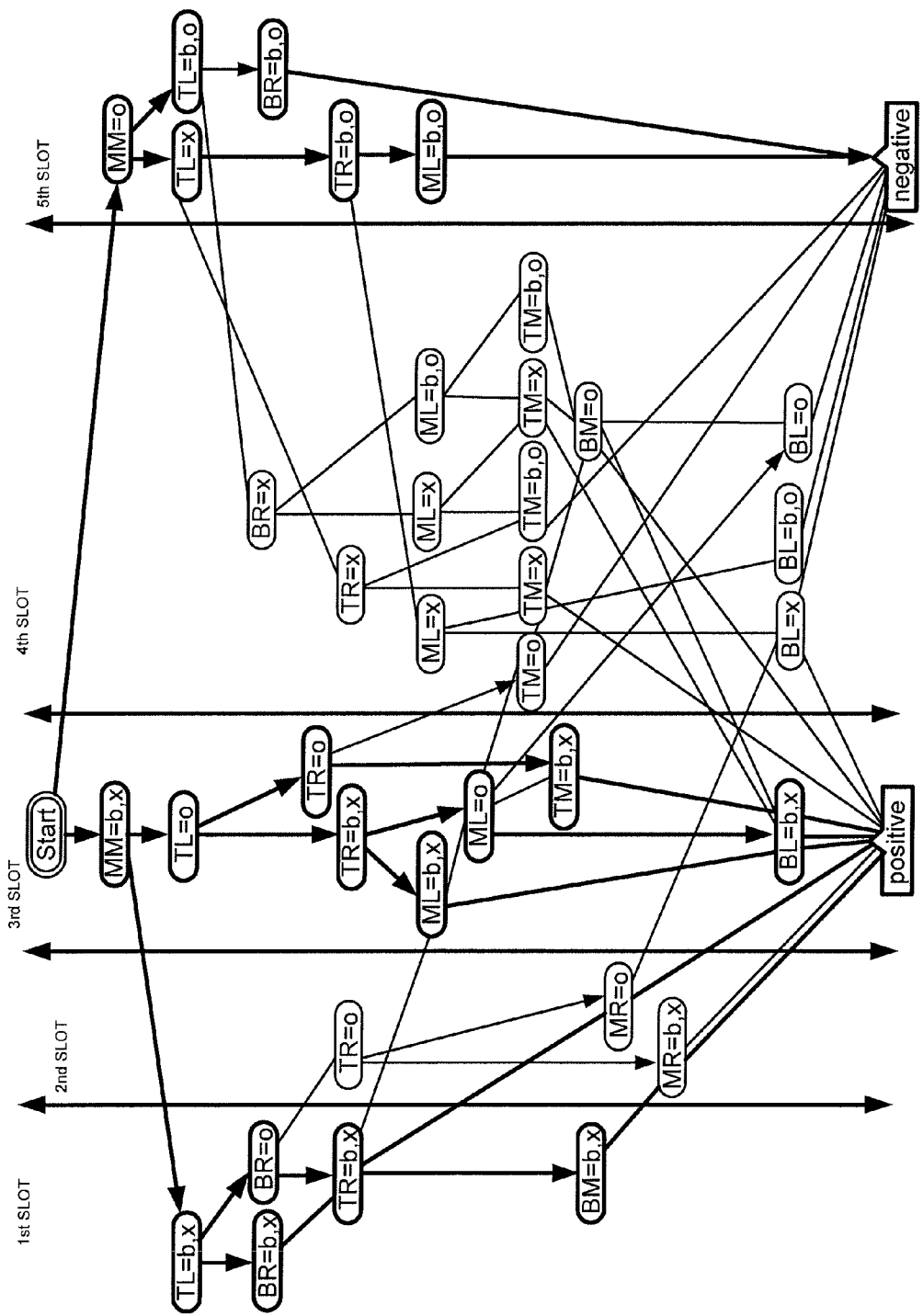
FIG. 9 shows the layout of the DAG after path-based highlighting.

Example: FIG. 9, shows a DAG with seven interesting paths. These paths were divided into clusters using a similarity score threshold of four common nodes. The result is a set of three path-clusters as shown. All the paths in the middle cluster contain four common nodes among themselves.

2) Divide the Interesting Nodes Into Clusters:

Node-clusters are formed from the path-clusters constructed above. Since paths in different path-clusters might have some common nodes, there could be nodes that are present in more than one cluster. Each node is placed into the cluster that contains the maximum number of paths through the node. Example: In FIG. 9, the node, "MM={b,x}" is contained in two interesting clusters as shown. The first cluster is in SLOT 1 and the second cluster is in SLOT 3. The second cluster contains two paths and the first cluster contains three paths through the node, and hence is assigned to the second cluster.

3) Find an Order in Which to Lay Out Node-Clusters.

The sub-graphs induced by the interesting node-clusters constructed above are laid out in disjoint vertical spans. Now, there could be edges between nodes in different clusters. The number of crossings each such edge has with other edges depends on the number of clusters by which they are separated and number of paths in the each cluster. Therefore, these clusters must be ordered such that these crossings are minimized. The following heuristic solves this problem. The heuristic orders the node-clusters such that clusters with more number of connecting edges are close to each others hence the edge crossing are reduced. Below are the steps:

a) Compute the Rank of each node-cluster: Let $A(i,j)$ be the number of edges between the node-clusters i and j. Then, the Rank of node-cluster C, Rank(C) is defined as $\Sigma(A(i,C)*i)/\Sigma(A(i, C))$. In other words, the Rank of C is the average of the cluster indices that have common edges with C, weighted by the number of edges in common.

b) Sort the node-clusters in increasing order of their ranks.

c) Find a suitable order of node-clusters with lesser edge-cluster crossings. Divide the node-cluster sorted list into contiguous sub-lists of size m. (The last list could have size<m). In exemplary implementation uses m=5 since it is feasible to compute all possible orders in reasonable time. For each sub-list, find the best order of node-clusters by computing all possible orders and finding the order with least edge-cluster crossings. Now append best orders in each sub-list in the same order as the original sub-lists to obtain an overall node-cluster order.

Example: In FIG. 9, there are three interesting clusters, namely the ones in SLOTs 1, 3 and 5 respectively. As can be seen 1, 3, 5 is an optimal order because it has no crossings between edges on important paths in different clusters. Also, laying out the interesting clusters in a different order, namely, with the right-most cluster in the middle, would have certainly increased crossings between edges on interesting paths.

4) Divide the Non-Interesting Nodes Into Clusters.

In this step, the non-interesting nodes are divided in the space available between the interesting node-clusters such that a node is close to its neighbors. As a result, crossings of the edges coming out of non-interesting nodes are reduced. The steps are detailed below:

1. Suppose the interesting node-clusters are k, and then 2k−1 slots are defined such that even number of slot numbers from 1 to 2k−1 are used for placing nodes of the interesting node-clusters in the order computed in step (3). The non-interesting nodes will be distributed in the remaining k−1 slots.

2. Initially only interesting nodes are assigned slot numbers. In this step, we will assign slot numbers to non-interesting nodes and place nodes in the slot with that number.

a) The non-interesting nodes that are neighbors of interesting nodes are considered. For each such node, the number of edges (incoming and outgoing) connecting to interesting nodes is computed. Then iterate over them in increasing order of this number and compute the slot number as follows in (b) and (c).

b) For every non-interesting node, identify all the nodes that have been already assigned a slot number and have connecting paths to it.

c) The weighted average slot number of the identified nodes is computed by multiplying their slot number with the number of connecting paths. The closest even positive number to the computed weighted average is determined and this slot is assigned to non-interesting node.

d) Repeat step b) and c) till all the non-interesting nodes are assigned slots.

5) Layout Node-Clusters:

Each slot in last step 4) represents a cluster of the nodes that need to be laid out together. The slots have disjoint vertical spans and the DAG layout described above is used to layout the node-clusters in each slot. Example: In FIG. 9, there are five slots and the clusters assigned to them are laid out using DAG layout.

Some or all of the functional operations described in this specification can be implemented in digital electronic circuitry, or in computer software, firmware, or hardware, including the structures disclosed in this specification and their structural equivalents, or in combinations of them. Implementations can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate implementation, may also be provided in combination in a single implementation. Conversely, various features which, for brevity, are described in the context of a single implementation, may also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular implementations of the invention have been described. Other implementations are within the scope of the following claims. For example, the steps recited in the claims can be performed in a different order and still achieve desirable results. In addition, implementations of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed is:

1. A computer-implemented method for drawing directed acyclic graphs, the method comprising:

receiving, in a computing system comprising at least one computer processor, information representing a directed acyclic graph;

providing the information to the at least one computer processor of the computing system:

generating a layout of the directed acyclic graph utilizing the computing system, the layout comprised of one or more subgraphs, each subgraph comprising two or more nodes and edges that connect pairs of nodes, the nodes and edges being defined in x- and y-coordinates;

reducing the number of edge crossings in the layout of the directed acyclic graph utilizing the computing system;

straightening the edges of the layout of the directed acyclic graph utilizing the computing system, the straightening increasing a number of vertical edges in the directed acyclic graph;

compacting the one or more subgraphs along x-coordinate axis to generate a compacted directed acyclic graph layout associated with a compacted directed acyclic graph utilizing the computing system; and assigning new y-coordinates to the nodes of the one or more subgraphs such that the nodes do not overlap in the y-coordinate to generate a new directed acyclic graph utilizing the computing system, wherein assigning new y-coordinates comprises:

computing, for each level of a plurality of levels of the layout of the directed acyclic graph, a weight function that is the ratio of a square of incoming edges to the each level and a number of nodes at the each level; and adjusting vertical separation between adjacent levels of the plurality of levels in proportion with computed weight functions associated with the adjacent levels.

2. The method in accordance with claim 1, wherein generating the layout of the directed acyclic graph further comprises:

creating a tree copy of the directed acyclic graph;

determining the width of each subgraph in the tree copy; and generating a layout of the tree copy and using it to layout the input directed acyclic graph such that no overlaps occur in the x-coordinate.

3. The method in accordance with claim 1, wherein reducing the number of edge crossings in the directed acyclic graph further comprises:

sorting, using the layout, child nodes of each node of a plurality of child nodes in an increasing order of order weight.

4. The method in accordance with claim 3, wherein calculation of order weight for each child node comprises:
identifying nodes that are at a higher level than each child node of the plurality of child nodes and that have an edge to a descendant node of the child node; and
computing a median of x-coordinates of the identified nodes, the computed median being the order weight of the child node.

5. The method in accordance with claim 1, wherein the straightening of the edges of the directed acyclic graph further comprises maximizing a number of vertical median edges that start or end at nodes at each level in the layout of the directed acyclic graph.

6. The method of claim 5, wherein:
the layout of the directed acyclic graph is used to determine a child-order of a plurality of child-orders that is associated with each corresponding node of a plurality of nodes in the layout; and
the reducing of the number of edge crossings is performed by changing the determined child-order of at least one node of the plurality of nodes,
the changing being performed such that the at least one node is placed, subsequent to the changing, at a location closer to other one or more nodes with which the at least one node shares descendents in the layout.

7. The method of claim 6, wherein:
the number of reduced edge crossings is maintained during the edge straightening; and
the changed child-order is maintained during the edge straightening.

8. The method in accordance with claim 1, wherein the compacting of the one or more subgraphs further comprises:
partitioning the directed acyclic graph into a plurality of vertical chains; and
compacting the plurality of vertical chains closer without causing node overlaps between pairs of adjacent vertical chains, the compacting comprising moving at least one vertical chain towards other one or more vertical chains of the plurality of vertical chains such that edges associated with the at least one vertical chain are maintained as vertical edges during the moving and such that a number of nodes in each level of the directed acyclic graph is maintained during the moving.

9. The method in accordance with claim 1, further comprising outputting new x- and y-coordinates of the new directed acyclic graph.

10. A computer program product comprising a machine-readable medium storing instructions that, when executed by at least one programmable processor, cause the at least one programmable processor to perform operations comprising:
generating a layout of the directed acyclic graph, the layout comprised of one or more subgraphs, each subgraph comprising two or more nodes and edges that connect pairs of nodes, the nodes and edges being defined in x- and y-coordinates;
reducing the number of edge crossings in the layout of the directed acyclic graph, the reducing comprising moving at least one node of the two or more nodes to a location closer to other one or more nodes with which the at least one node shares descendent nodes in the layout;
straightening the edges of the layout of the directed acyclic graph;
compacting the nodes of the one or more subgraphs along x-coordinate axis to generate a compacted directed acyclic graph layout; and
assigning new y-coordinates to the nodes of the one or more subgraphs such that the nodes do not overlap in the y-coordinate to generate a new layout for directed acyclic graph, wherein assigning new y-coordinates comprises:
computing, for each level of a plurality of levels of the layout of the directed acyclic graph, a weight function that is the ratio of a square of incoming edges to the each level and a number of nodes at the each level; and
adjusting vertical separation between adjacent levels of the plurality of levels in proportion with computed weight functions associated with the adjacent levels.

11. The computer program product in accordance with claim 10, wherein generating the layout of the directed acyclic graph further comprises:
creating a tree copy of the directed acyclic graph;
determining the width of each subgraph in the tree copy; and
generating a layout of the tree copy and using it to layout the input directed acyclic graph such that no overlaps occur in the x-coordinate.

12. The computer program product in accordance with claim 10, wherein reducing the number of edge crossings in the layout of the directed acyclic graph further comprises sorting children nodes of every node in the increasing order of an order weight.

13. The computer program product in accordance with claim 12, wherein the order weight calculation for each child node N further comprises:
identifying nodes that are at a higher level than N and have an edge to a descendant node of N; and
computing an order weight of N as the median of x-coordinate of these identified nodes.

14. The computer program product in accordance with claim 10, wherein straightening the edges of the layout of the directed acyclic graph further comprises maximizing a number of vertical median edges that start or end at nodes at each level in the layout of the directed acyclic graph.

15. The computer program product in accordance with claim 10, wherein compacting one or more subgraphs along x-coordinate axis further comprises:
partitioning the graph into two or more vertical chains; and
compacting the two or more vertical chains closer without causing any node overlaps between pairs of adjacent vertical chains.

16. The computer program product in accordance with claim 10, further comprising outputting new x- and y-coordinates of the new layout of the directed acyclic graph.

17. A system comprising:
at least one programmable processor; and
a machine-readable medium storing instructions that, when executed by the at least one processor, cause the at least one programmable processor to perform operations comprising:
receiving information representing a directed acyclic graph;
generating a layout of the directed acyclic graph, the layout comprising two or more nodes and edges that connect pairs of nodes, the nodes and edges being defined in x- and y-coordinate;
reducing the number of edge crossings in the layout of the directed acyclic graph;
straightening the edges of the layout of the directed acyclic graph, the straightening increasing a number of vertical edges in the directed acyclic graph;
compacting along x-coordinate axis to generate a compacted directed acyclic graph layout; and assigning new y-coordinates to the nodes of the compacted directed acyclic graph layout such that the nodes do not overlap in the y-coordinate, to generate a new layout for directed acyclic graph, wherein assigning new y-coordinates comprises:

computing, for each level of a plurality of levels of the layout of the directed acyclic graph, a weight function that is the ratio of a square of incoming edges to the each level and a number of nodes at the each level; and adjusting vertical separation between adjacent levels of the plurality of levels in proportion with computed weight functions associated with the adjacent levels.

18. The system in accordance with claim 17, wherein the at least one programmable processor performs further operations comprising:

outputting new x- and y-coordinates of the new layout of directed acyclic graph.

\* \* \* \* \*